United States Patent [19]

Davis

[11] Patent Number: 4,734,769
[45] Date of Patent: Mar. 29, 1988

[54] METHOD AND APPARATUS FOR DISPLAY OF VARIABLE INTENSITY PICTURES ON A VIDEO DISPLAY TERMINAL

[75] Inventor: Mark A. Davis, East Lansing, Mich.

[73] Assignee: Professional Guidance Systems, Inc., Lansing, Mich.

[21] Appl. No.: 745,441

[22] Filed: Jun. 17, 1985

[51] Int. Cl.$^4$ .......................... H04N 7/06; H04N 7/08
[52] U.S. Cl. .................................... 358/142; 358/146; 358/183
[58] Field of Search ................. 358/142, 146, 147, 22, 358/183, 903; 340/721, 745, 747, 750; 364/521, 523

[56] References Cited

U.S. PATENT DOCUMENTS

| | | | |
|---|---|---|---|
| 3,712,956 | 1/1973 | Lemelson | 358/903 |
| 4,139,860 | 2/1979 | Micic et al. | 358/22 |
| 4,178,613 | 12/1979 | Takahashi et al. | 358/183 |
| 4,205,340 | 5/1980 | Kouno et al. | 358/130 |
| 4,288,809 | 9/1981 | Yabe | 358/12 |
| 4,450,442 | 5/1984 | Tanaka | 340/814 |
| 4,498,098 | 2/1985 | Stell | 358/22 |
| 4,530,009 | 7/1985 | Mizokawa | 358/903 |
| 4,597,005 | 6/1986 | Baleshta et al. | 358/147 |

Primary Examiner—James J. Groody
Assistant Examiner—Michael D. Parker
Attorney, Agent, or Firm—Ian C. McLeod

[57] ABSTRACT

A method and apparatus for adapting a video display terminal (VDT) to display variable-intensity pictorial information. The pictorial information is received as serial digital data which is stored in a digital memory. Following this load operation, the stored data are read from the memory under control of VDT synchronization signals, converted to analog signals, and displayed. A variety of formats are possible, including pictorial information only and a concurrent display of pictorial and alphanumeric information. An apparatus permitting concurrent display of variable-intensity and alphanumeric information is disclosed.

16 Claims, 9 Drawing Figures

METHOD AND APPARATUS FOR DISPLAY OF VARIABLE INTENSITY PICTURES ON A VIDEO DISPLAY TERMINAL

FIELD OF THE INVENTION

This invention relates to a method and apparatus for displaying pictorial information on a video display terminal and, more particularly, to a method and apparatus for separately and concurrently displaying variable intensity pictorial image and alphanumeric information on the same alphanumeric video display terminal.

BACKGROUND OF THE INVENTION

Commonly, video display terminals (VDTs) are used as input/output terminals for computer and communications systems. Such VDTs usually serve to display alphanumeric information. One form of VDT, the raster scan VDT, requires, as inputs, a video signal containing the information to be displayed, along with horizontal and vertical synchronization signals, driven by a clock signal, which is also used by the VDT. The video signal is an analog signal which causes variations in display intensity along each horizontal scan line.

In the case of an alphanumeric raster scan VDT, these scan-line variations, when displayed parallel to each other, convey the intended alphanumeric information. The video signal is generated in coordination with a character generator, which actually produces a series of analog signals, each corresponding to a different row of dots within a string of characters to be displayed. There are typically seven or nine rows of dots within each character string. An alphanumeric raster-scan VDT can be caused to display images with much higher resolution by allowing each row of dots to be independently created. A VDT with these capabilities can be used to display variable-intensity pictures.

Some VDTs are designed specifically to display pictorial information. Typically these VDTs have very high resolution, e.g., at least one thousand scan-lines, each row containing at least one thousand columns. Terminals having such high resolution capabilities (over 1,000,000 pixels displayable) are costly. To illustrate, the information to be displayed on a high resolution VDT is generally stored in a digital memory device. Raster-scanning such a display requires that the memory elements be read out sequentially and corresponding video signals be produced. Because of the high data rates such an approach requires, the enabling hardware are correspondingly high priced.

Many applications require only a moderate degree of resolution. Low cost VDTs, if provided with the proper signals, can serve this purpose.

SUMMARY OF THE INVENTION

According to one aspect of the invention, a method is provided for displaying pictorial and alphanumeric information on a video display terminal. Digitally-encoded pictorial information is received and stored in a digital memory. A composite video signal is produced by combining a received video signal representing digitally-encoded alphanumeric information and the stored pictorial information read from the digital memory. The pictorial information can represent the pictures in a variable-intensity form. The information may be presented in a variety of formats, including: the picture only, in either low resolution or high resolution forms, alphanumeric information only or a concurrent display of both pictorial and alphanumeric information. In a method which is a perferred form of the above, an additional step provides for displaying the video signal on a video display terminal.

According to a further aspect of the invention, an apparatus is provided for displaying pictorial and alphanumeric information on a video display terminal. The apparatus is adapted to receive synchronization signals, a video signal representing digitally-encoded alphanumeric information and digitally-encoded pictorial information. Memory means and means adapted to store and read the digitally-encoded pictorial information to and from the memory means are also provided. The apparatus further includes means adapted to produce a composite video signal by combining the received video signal pictorial and the alphanumeric information in response to the synchronization signals. This apparatus can be adapted to provide variable-intensity pictorial information and can provide the video signals to a raster scan video display terminal.

DETAILED DESCRIPTION OF THE PREFERRED EMBODIMENT

Figure 1:
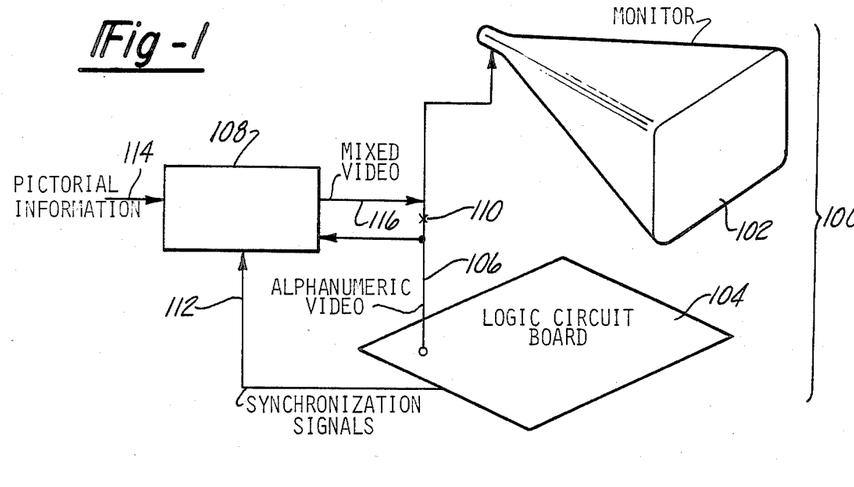
FIG. 1 is a schematic diagram, showing the modifications to an existing video display terminal which are required when placing the apparatus according to one aspect of the invention into service. This figure also shows the structure of the overall apparatus according to a second aspect of the invention.

FIG. 1 shows, in block diagram form, an embodiment of the invention to comprise a video display terminal (VDT) 100, the major components of which are a monitor 102 and a logic board 104. In a conventional arrangement VDT 100 creates an alphanumeric video signal on line 106, which is sent to monitor 102 for display. To modify VDT 100 according to the present invention, logic circuitry 108 is added to receive the alphanumeric video signal over line 106 and line 106 is broken at point 110. Synchronization signals are transmitted from circuitry board 104 to circuit 108 over line 112. These synchronization signals include vertical and horizontal synchronization and a dot clock signal.

Logic circuitry 108 receives digitally-encoded pictorial information on line 114. In response to the video signals received over line 106, synchronization signals received over line 112, and pictorial information received over line 114, logic circuit 108 creates a mixed video signal which is sent over line 116. In addition to simply modifying an existing VDT 100 to include logic circuitry 108, an entire VDT incorporating these features may be built.

Figure 2:
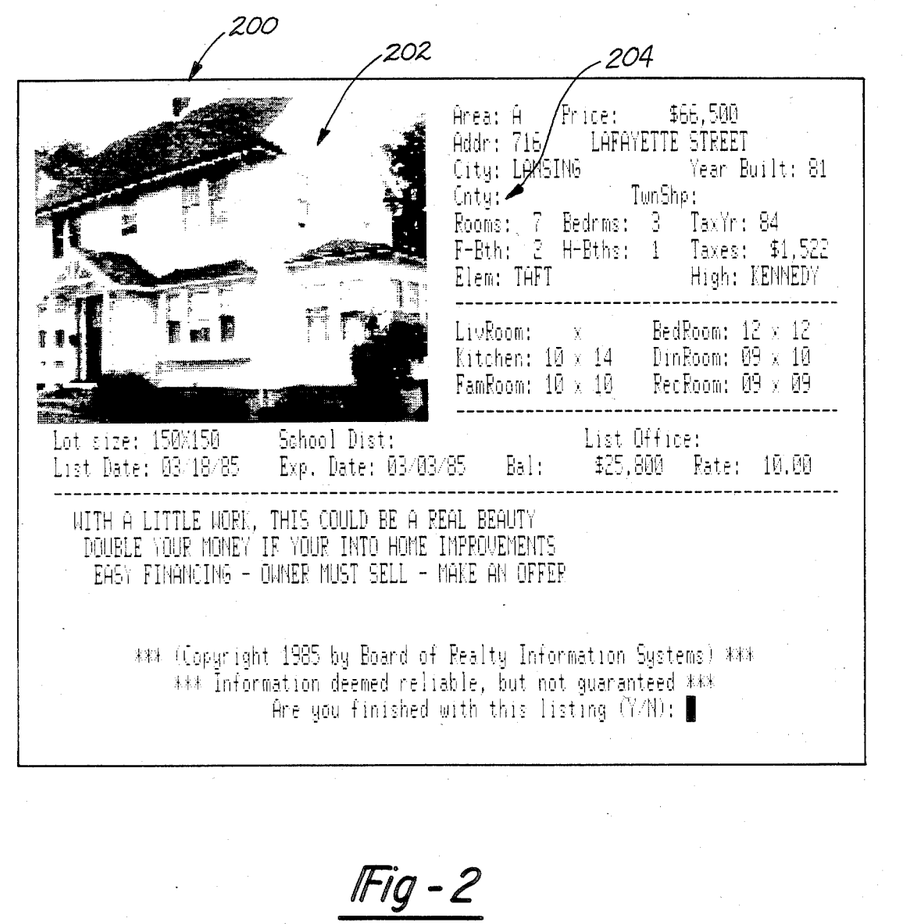
FIG. 2 shows an example of the display of combined pictorial and alphanumeric information on a video display terminal according to the present invention.

In FIG. 2 of the drawings, one may see an example of the display provided by a VDT incorporating the logic circuit 108 (in FIG. 1). Shown is a concurrent display of pictorial and alphanumeric information. The entire image 200 displayed on monitor 102 of the apparatus shown in FIG. 1 contains pictorial information 202, the balance of the display being alphanumeric information 204. One skilled in the art will appreciate that the pictorial information 202 has a much higher resolution than alphanumeric information 204. Furthermore, each picture element in pictorial information 202 can be of a different intensity creating a shading effect which improves the presentation of the information.

Figure 3:
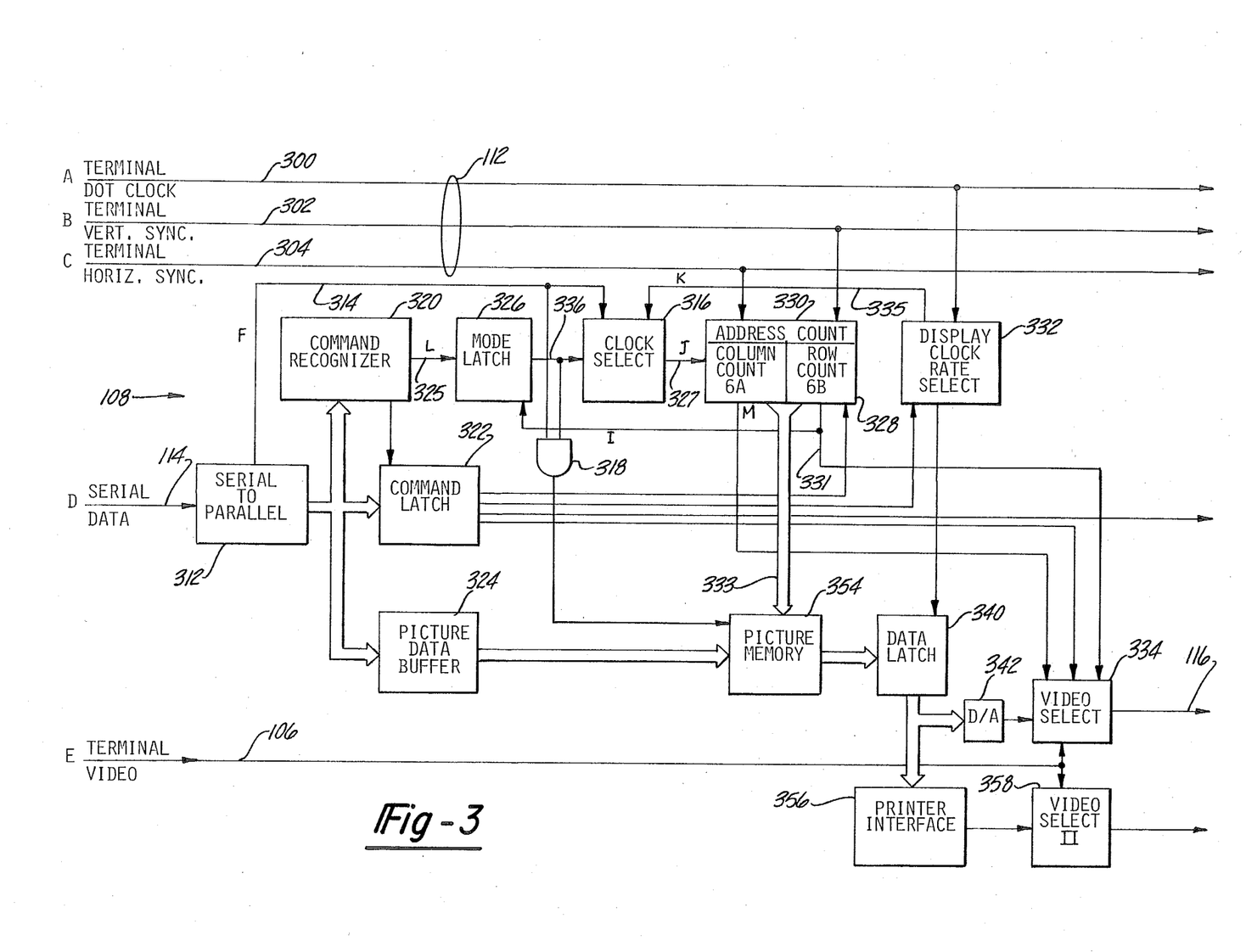
FIG. 3 is a block diagram, showing the flow of and interrelationships among the signals and circuits in the apparatus of the preferred embodiment.

Referring now to FIG. 3, those skilled in the electronic art will appreciate that a raster-scan video display terminal (VDT) requires four signals: dot clock signal 300, vertical and horizontal synchronization signals 302 and 304 (collectively referred to as 112 in FIG. 1), and terminal video signal 106. They are also provided to apparatus 108, which is interposed between the raster scan signal source, logic circuit 104 (in FIG. 1), and monitor 102 (in FIG. 1).

The data representing the pictorial information which is to be presented is received in serial fashion on serial data line 114. These serial representations are converted to a parallel form through serial-to-parallel converter 312. Convertor 312 produces a timing signal F on line 314 which is sent to both a clock select circuit 316 and an AND gate 318.

Converter 312 also provides its parallel data to three devices. One device is command recognizer 320 which scans these parallel data for the occurrence of a command, preceding the pictorial information, which changes the mode of apparatus 108. The parallel signals are also sent to command latch 322 which, when appropriately driven by command recognizer 320, captures the data from converter 312 as a command. The data from converter 312 is also presented to the third device, picture data buffer 324, which will be further described below.

Figure 4:
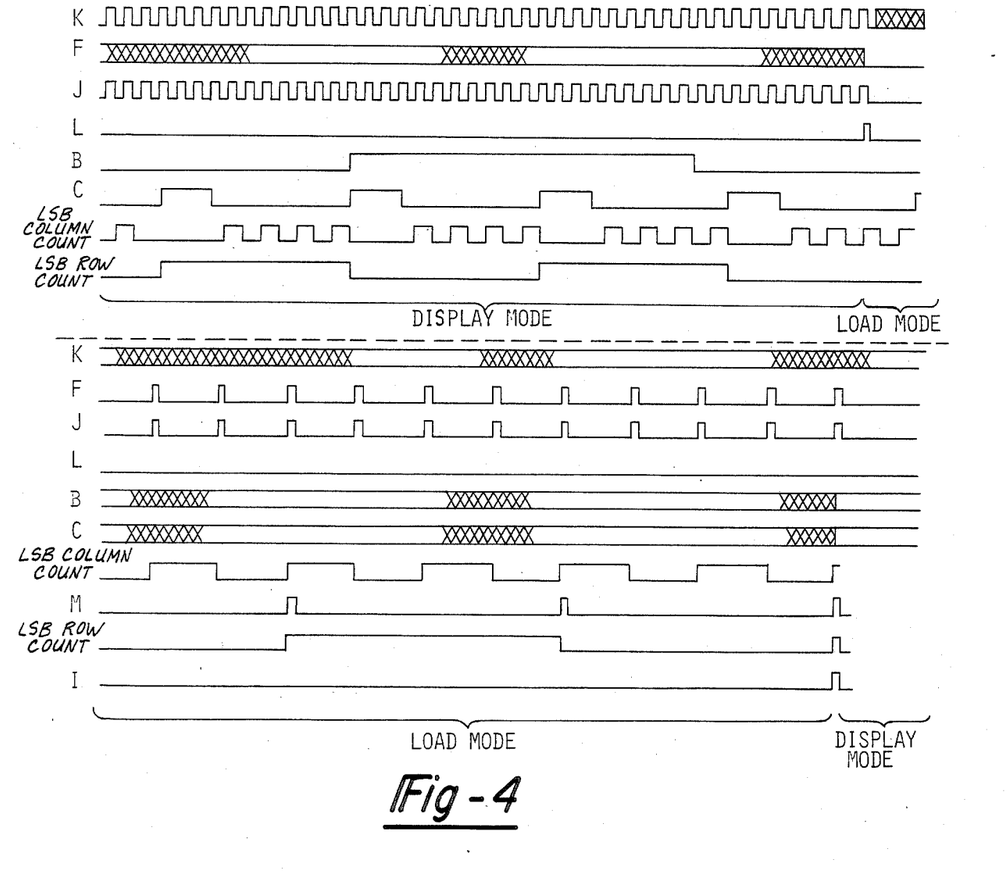
FIG. 4 is a timing diagram to explain the sequencing of signals which exist in the apparatus of the preferred embodiment.

Command recognizer 320 produces two signals. One signal drives command latch 322 upon recognizing a command. On this same event command recognizer 320 sends a signal I over line 325 to mode latch 326 which, in turn, puts apparatus 108 into its "load" mode, from its "display" mode. This is shown in the upper half of FIG. 4.

"Load" Mode

In the "load" mode, device 108 is set to accept pictorial information over serial data line 114, placing it in picture memory 354 for subsequent display.

After receiving a signal from command recognizer 320, which places apparatus 108 in "load" mode, command latch 322 sends a signal to the row count component 328 of address count circuit 330. It also sends a signal to display clock rate select device 332, to the printer control device (not shown), and to video select device 334.

Picture data buffer 324 accepts parallel representations of picture data, the buffer storing the pictorial information until the address count device 330 has designated a selected location in picture memory 354. Upon this event, data are transferred from picture data buffer 324 to the appropriate picture element (pixel) in picture memory 354.

Mode latch 326 produces a signal on line 336 when mode latch 326 is ready to cause the loading of data from serial-to-parallel convertor 312 into appropriate locations in picture memory 354. Passing the signals on lines 114 and 336 through AND gate 318 assures that both the proper mode (as signified by the signal on line 336) and the timing (signal F on line 314) are present before picture memory 154 will store data.

In "load" mode, timing signal F on line 314 is characterized by a pulse occurring each time a new set of serial data is converted to parallel form by serial-to-parallel converter 311. These pulses are sent to clock select 316, whose state causes signal J on line 327 to be pulses in synchronism with the pulses in signal F. This is shown in the lower portion of the timing diagram in FIG. 4. This clock select signal 327 drives address count device 330 which, in turn, controls the loading of data into picture memory 354. Noting that the clock select signal is coordinated with horizontal sync signal 104 and vertical sync signal 102 by address count device 130, address count device 130 can produce proper addresses for appropriately driving the picture memory 154.

Row count component 328 of address count device 330 produces a pulsed signal I on line 331 when its count exceeds the number of rows to be displayed on the VDT. As shown in the lower portion of FIG. 4, this causes mode latch 326 to change its state from the "load" mode to the "display" mode. Address count device 330, of course, produces a sequence of addresses which are sent over bus 333, facilitating storage of data contained in picture data buffer 324 into the appropriate locations in picture memory 354.

"Display" mode

In the "display" mode, device 108 is set to display the pictorial information data stored in picture memory 354, the alphanumeric character representations which are received in the form of terminal video signal 106, or some concurrent combination thereof. The format is controlled by commands received through serial data line 114. These commands are recognized and latched by command recognizer 320 and command latch 322 and thereby control clock select 316, address count 330, display clock rate select 332, and video select 334.

Upon changing state, model latch 326 forces clock select 316 to produce the series of pulses in signal J on line 327 for address count 330 in response to the signal K sent over line 335 by display clock rate select 332. This is shown in the upper portion of FIG. 4. Command latch 322 provides display clock rate 332 and video select 334 with signals controlling the size and location of the display of the pictorial information.

Video select 334, such as a pair of pass transistors alternatively selectable by logical operations, determines whether the video monitor will be sent the terminal video signal 106 or the analog signal produced by digital-to-analog (D/A) converter 342. The digital data sent to D/A converter 342 is produced, under control of display clock rate select device 332, from picture memory 354 through data latch 340.

Data from data latch 340 is also sent to printer interface 356, which converts the data to a form suitable for display by a printer. Video select 358 controls whether terminal video signal 106 or the converted pictorial information produced by printer interface 356 will be passed through to the printer.

Apparatus 108 is maintained in "display" mode until another command to receive pictorial information is received by command recognizer 320 through serial data line 114 and serial-to-parallel converter 312.

Figure 5A:
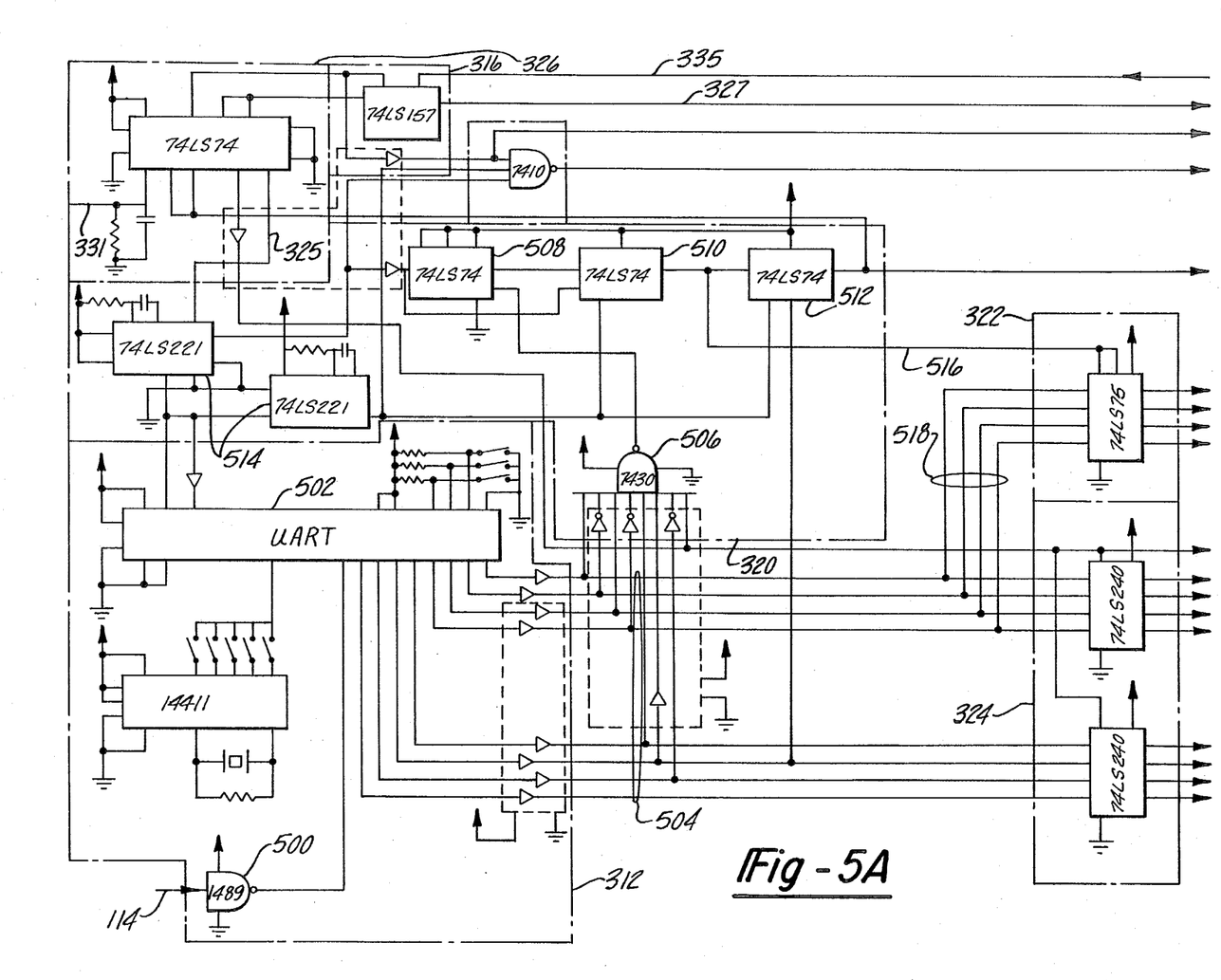
FIGS. 5A to 5E are schematic diagrams showing the layout of the apparatus of the preferred embodiment.

Referring now to FIGS. 5A to 5E of the drawings, details of the circuitry outlined in block diagram form in FIG. 3 will be given. As shown in FIG. 5A, serial data received on line 114 is received by an RS-232 quadline receiver 500, which sends data to UART 502. Together, receiver 500 and UART 502 compose serial-to-parallel converter 312. Converter 312 produces parallel data 504, which is sent to command recognizer 320, command latch 322 and picture data buffer 324.

Command recognizer 320 consists of NAND gate 506, flip-flops 508, 510, 512 and dual one shot device 514.

Command latch 322, which receives a signal from command recognizer 520 over line 516, and also receives parallel data over lines 518, consists of a 74LS75 quad latch.

Picture data buffer 324, receiving parallel signals over lines 504, is composed of two octal inverter bus-/line drivers, such as a 74LS240.

Mode latch 326 consists of a 74LS74 flip-flop receiving signal L (shown in FIG. 4) on line 325 and signal I (in FIG. 4) on line 331. Quad select 316 is a 74LS157 quad 2/1 multiplexer which produces signal J (in FIG. 4) on line 327. Quad select 316 receives signal K (in FIG. 4) on line 335.

Figure 5B:
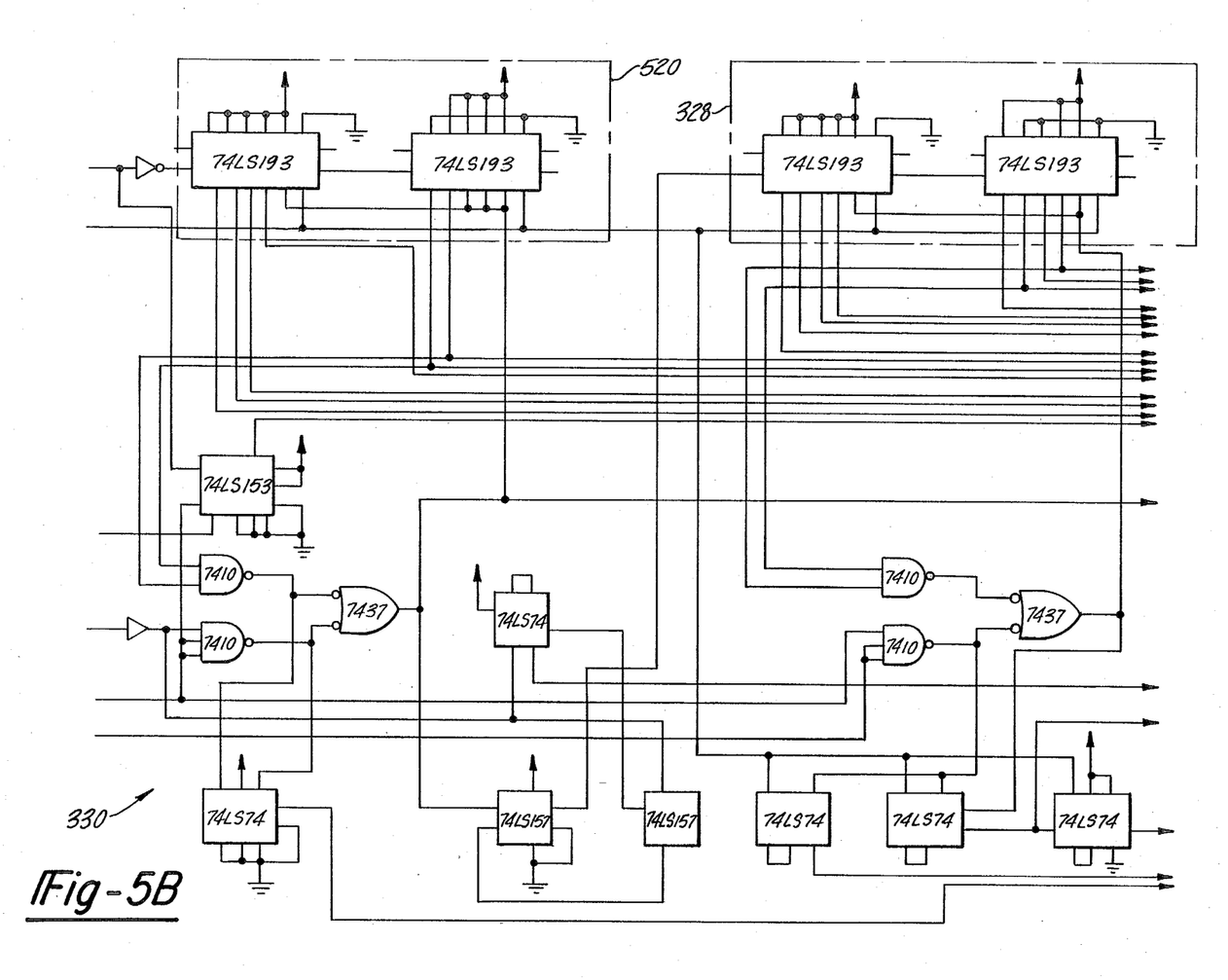

Referring now to FIG. 5B of the drawings, which shows address counter device 330 it may be seen that row count 328 is composed of two 4-bit up/down binary counters, consisting of 74LS193's. Likewise, column count 520 is composed of two 74LS193's.

Figure 5C:
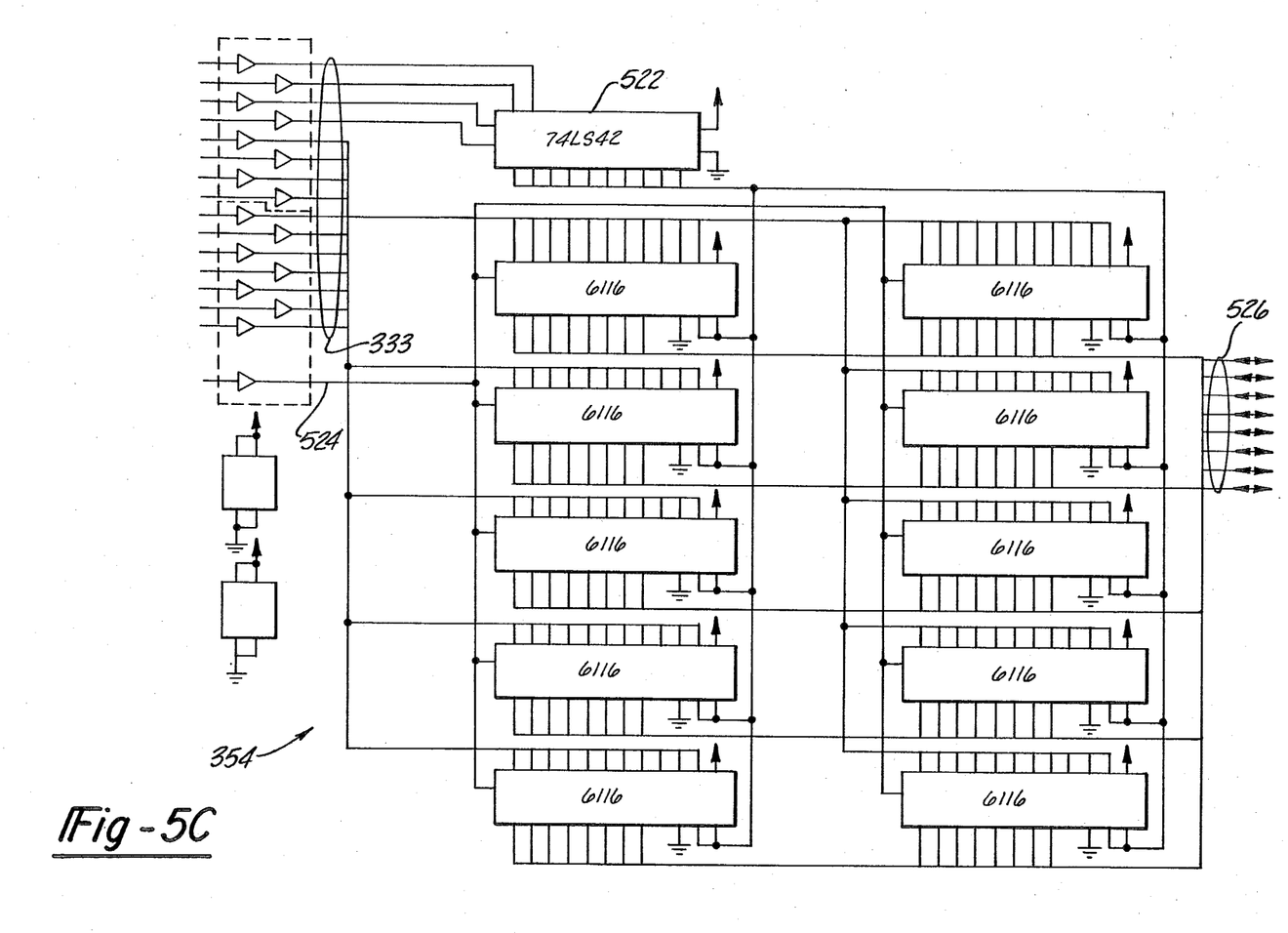

FIG. 5C of the drawings shows picture memory 354 which comprises ten 6116 2,048 by 8-bit CMOS RAM chips, and a BCD to decimal decoder 522, such as a 74LS42. Picture memory 354 receives a signal from gate 318 over line 524, address data over lines 333, and the picture data from picture data buffer 324 over lines 526.

Figure 5D:
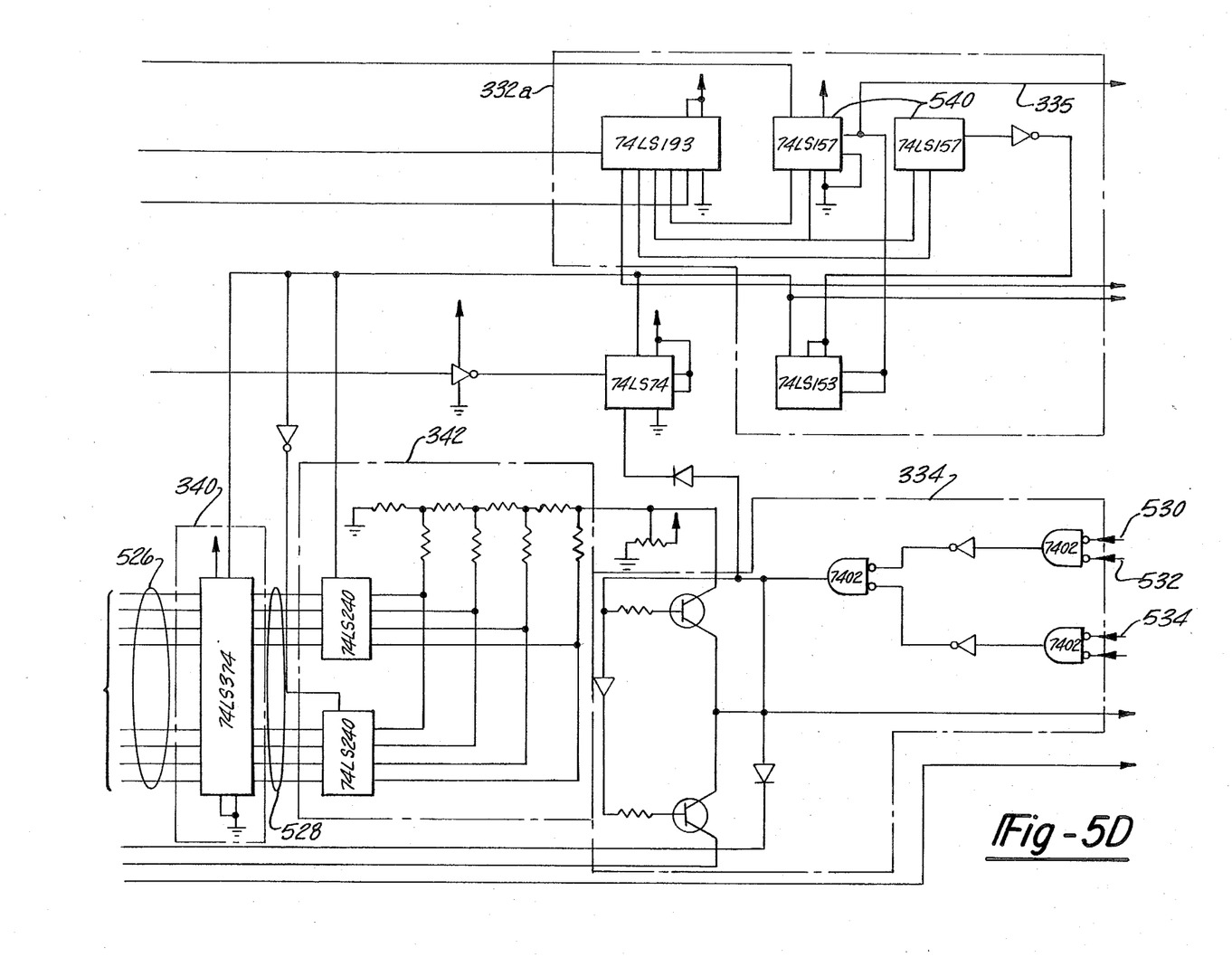

As shown in FIG. 5D of the drawings, data latch 340 receives data from picture memory 354 over lines 526. Data latch 340 is an octal D flip-flop, such as a 74LS374.

Ditigal to analog converter 342 receives data from data latch 340 over lines 528. Converter 34 comprises two octal inverting bus/line drivers, such as 74LS240's and a network of resistors. Video select I 334 receives signals from digital to analog converter 342, as well as address count 330 (on lines 530 and 532) command latch 322 (on line 534).

Figure 5E:
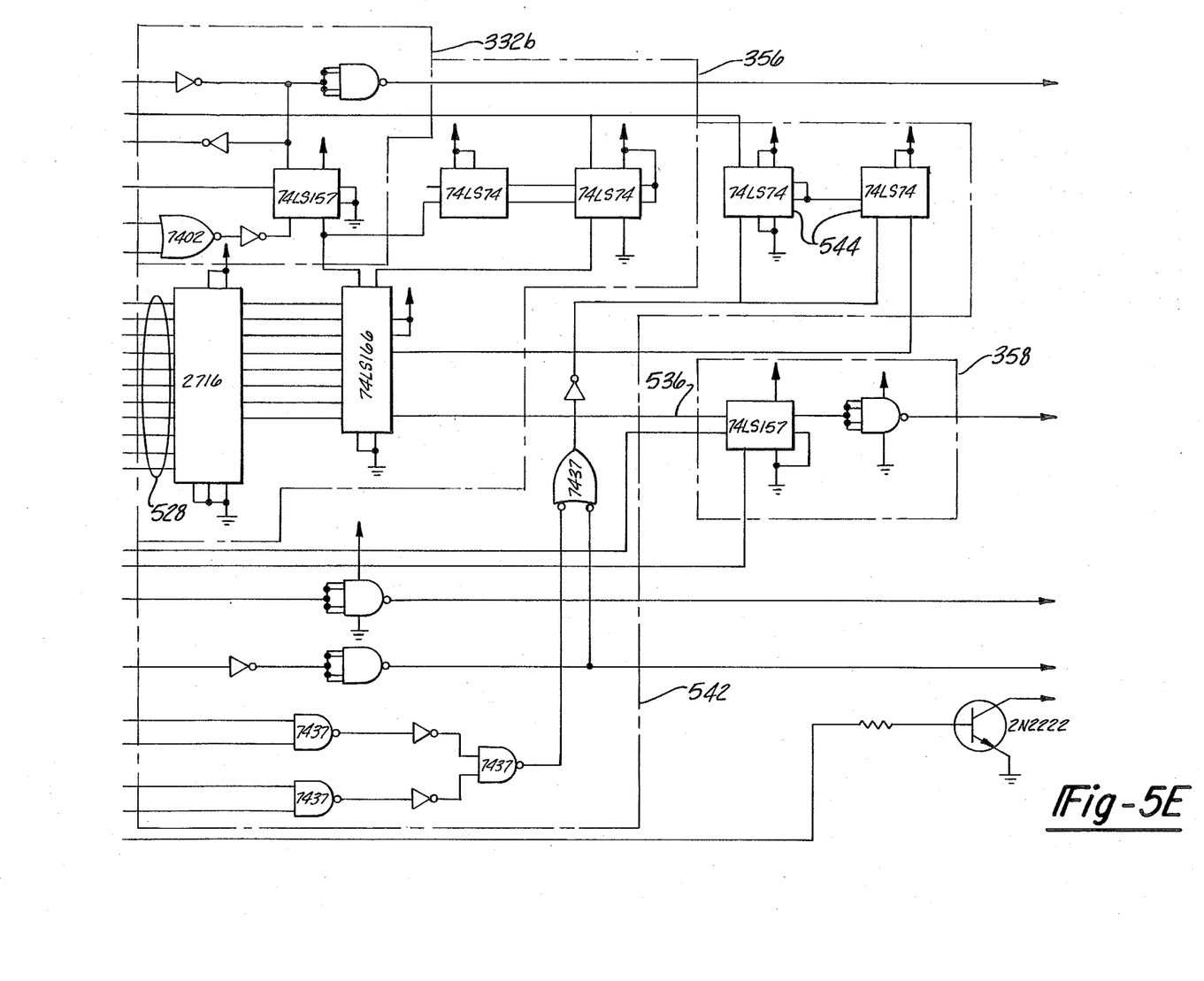

As shown in FIG. 5E of the drawings, printer interface 356 comprises circuitry for preparing a serial video signal for use by a printer. It receives signals on lines 528, passing its output to video select 358 over line 536. Printer interface 356 comprises interface chips such as 2716 and 74LS166 along with circuitry comprising multiplexers (74LS157) and flip-flops (74LS74).

Video select II 358 comprises a quad 2/1 multiplexer, such as a 74LS157 along with a NAND gate.

Display clock rate select device 332 is subdivided in FIG. 5. One part, 332a, is shown in FIG. 5D and a second part, 332b, is shown in FIG. 5E. As shown in FIG. 5E device 332b produces clock signals in response to a terminal clock signal received from an external source. The clock signal is passed to device 332a on FIG. 5D where it drives a 4-bit up/down binary counter (a 74LS193), whose output drives a dual 2/1 multiplexer 540. These devices produce the display dot clock signal on line 335 which is used to drive clock select 316. It also produces a latch data signal which is used by data latch 340.

FIG. 5E also discloses blanking circuit 542 comprising commonly-found logic gates and dual D flip-flop devices 544 (such as 74LS74s). The purpose of this circuit is to provide a blanking signal to printer interface 356, to disable outputs on the printer video signal produced by video select 358.

It is apparent that various alternative embodiments of this invention may be set forth by those skilled in the art without departing from the spirit or scope of the following claims which are intended to encompass such alternative embodiments.

I claim:

1. A method of displaying photographic information comprising a plurality of digitally-encoded pixels and alphanumeric information on a video display terminal, comprising the steps of:
   receiving the plurality of digitally-encoded pixels;
   storing each of the digitally-encoded pixels in a digital memory means;
   receiving a video signal representing the alphanumeric information;
   reading at least some of the digitally-encoded pixels from the digital memory means; and
   producing a composite video signal by combining the received video signal and the stored, digitally-encoded pixels that are read from the digital memory means.

2. The method of claim 1 wherein each of the digitally-encoded pixels contains variable-intensity photographic information.

3. The method of claim 1, further including the step of choosing the composite video signal to represent one of a variety of display formats.

4. Apparatus adapted to produce video signals for displaying photographic information comprising a plurality of digitally-encoded pixels and alphanumeric information on a video display terminal, comprising:
   means for receiving synchronization signals;
   means for receiving the plurality of digitally-encoded pixels;
   means for receiving a video signal representing the alphanumeric information;
   digital memory means;
   means adapted to store each of the digitally-encoded pixels in the digital memory means;
   means adapted to read at least some of the digitally-encoded pixels from the digital memory means; and
   means adapted to produce a composite video signal by combining the received video signal and the stored, digitally-encoded pixels that are read from the digital memory means in response to the synchronization signals.

5. The apparatus of claim 4 wherein each of the digitally-encoded pixels contains variable-intensity photographic information.

6. The apparatus of claim 5 wherein the means adapted to produce the video signal produces is raster-scan signal.

7. A method of displaying photographic information comprising a plurality of digitally-encoded pixels and alphanumeric information on a video display terminal, comprising the steps of:
   receiving the plurality of digitally-encoded pixels;
   storing each of the digitally-encoded pixels in a digital memory means;
   receiving a video signal representing the alphanumeric information;
   reading at least some of the digitally-encoded pixels from the digital memory means;
   producing a composite video signal by combining the received video signal and the stored, digitally-encoded pixels that are read from the digital memory means; and displaying the composite video signal on a video display terminal.

8. The method of claim 7 wherein each of the digitally-encoded pixels contains information variable-intensity photographic information.

9. The method of claim 7, further including the step of choosing the composite video signal to represent one of a variety of display formats.

10. Apparatus adapted to display photographic information comprising a plurality of digitally-encoded pixels and alphanumeric information on a video display terminal, comprising:

means for receiving the plurality of digitally-encoded pixels;

memory means;

means for storing each of the digitally-encoded pixels in the memory means;

means for receiving a video signal representing the alphanumeric information;

means for reading at least some of the digitally-encoded pixels from the memory means;

means for producing a composite video signal by combining the received video signal and the stored, digitally-encoded pixels that are read from the memory means; and means adapted to receive and display the composite video signal on the video display terminal.

11. The apparatus of claim 10, wherein the memory means is a digital memory.

12. The apparatus of claim 11 wherein each of the digitally-encoded pixels contains variable-intensity photographic information.

13. The apparatus of claim 12, wherein the means for producing the composite video signal produces a raster-scan video signal.

14. Apparatus for displaying photographic information comprising a plurality of digitally-encoded pixels and alphanumeric information, comprising:

means for producing synchronization signals;

means for receiving the plurality of digitally-encoded pixels;

means for producing a video signal representing the alphanumeric information, the alphanumeric information being digitally encoded;

memory means;

means adapted to store each of the digitally-encoded pixels in the memory means;

means adapted to read at least some of the digitally-encoded pixels from the memory means;

means adapted to produce a composite video signal by combining the alphanumeric video signal and the stored, digitally encoded pixels that are read from the memory means in response to the synchronization signals; and means for displaying the composite video signal.

15. The apparatus of claim 14 wherein each of the digitally-encoded pixels contains variable-intensity photographic information.

16. The apparatus of claim 14, wherein the composite video signal display means is a cathode ray tube.

* * * * *